Oct. 21, 1969  R. D. RUTT  3,473,637
METAL SUPPORTED CARBON FRICTION DISC
Filed Aug. 9, 1968  3 Sheets-Sheet 1

INVENTOR.
Richard D. Rutt
BY
K. W. Brownell
HIS ATTORNEY

United States Patent Office 3,473,637
Patented Oct. 21, 1969

1

3,473,637
METAL SUPPORTED CARBON FRICTION DISC
Richard D. Rutt, Wilson, N.Y., assignor to The Carborundum Company, Niagara Falls, N.Y., a corporation of Delaware
Filed Aug. 9, 1968, Ser. No. 751,433
Int. Cl. F16d 69/02
U.S. Cl. 188—251                16 Claims

ABSTRACT OF THE DISCLOSURE

A disc-type brake having a plurality of friction discs, one or more of which comprises a central or inner annular portion of carbon or graphite and an outer peripheral portion of metal, the outer peripheral portion being in tension and the central or inner annular portion being under compression from the outer peripheral portion, the central or inner annular portion having a centrally disposed opening therein for cooperation with an arbor on which it is mounted.

BRIEF DESCRIPTION

This invention relates to disc brakes. Like other mechanical brakes, these brakes arrest the rotational motion of mechanical parts by converting mechanical energy to heat. The heat is produced by rubbing together two friction surfaces. In disc brakes, at least one of the friction surfaces is the face of a disc which is rotated relative to another friction surface. Multiple disc brakes are constructed from a plurality of friction discs, some driven, that is, fixed to the rotating part and others which are fixed or stationary. The disc surfaces are pressed against each other by axial forces to cause braking. Generally speaking, the kinetic energy absorbed per unit time is directly proportional to the pressure on the disc surfaces, the mean tangential velocity and the coefficient of friction of the disc surfaces at that velocity.

Disc brakes, like all brakes, must be capable of withstanding and absorbing or conducting away the heat created by braking. Otherwise the brake parts would be heated to temperatures at which they would fail, for example, by warping, fracture or disintegration.

Disc brakes have a variety of uses, one of which is for stopping aircraft. As aircraft become larger and larger and land at faster and faster speeds, it becomes increasingly difficult to provide them with satisfactory brakes. Aircraft brakes must be designed to stop the aircraft during normal landings with minimal friction surface wear. Aircraft brakes must also be designed to stop the aircraft following a rejected take-off under the worst possible combinations of weight and speed. In this instance, the kinetic energy which the brakes must absorb will be three or four times as much as that absorbed during normal landings. This use of the brakes usually renders them unserviceable for further use.

An ever present consideration in design of aircraft brakes is the need to minimize weight. This presents a dilemma. As the weight of the brake is reduced its capacity as a heat sink is also reduced, and, therefore, its braking temperatures are increased. (Conventional multiple disc aircraft brakes reach temperatures in the range of 400–500° C. during normal landings.) Unfortunately, increased temperatures result in increased brake wear. Increased temperatures also result in a reduction of the friction coefficient developed between rubbing surfaces. This may be fatal in the case of an emergency landing when the brake temperature may reach more than twice that reached in normal service. If temperatures become high enough in any landing, metal discs will warp which renders them unserviceable.

2

Efforts to improve aircraft disc brakes have been focused on the friction discs. They must be manufactured from materials that have good heat capacity, good thermal conductivity, satisfactory friction properties, satisfactory tensile and shear strengths over the range of operational temperatures, and finally, good resistance to wear, and preferably of light weight. Most discs are now fabricated from metal. Resin bonded pads are often used on smaller aircraft. As a general rule, the stationary discs have resin pads and the driven discs are made from metal. One recent development in brake discs is the use of beryllium metal. The following table includes thermal properties of typical metals used in friction discs.

TABLE

| | Steel | Copper | Beryllium |
|---|---|---|---|
| Thermal conductivity B.t.u./ft.$^2$/° F./ hr./ft.) | 24 | 220 | 90 |
| Melting point (° F.) | 2,732 | 1,976 | 2,345 |
| Heat capacity B.t.u./lb./° F.) | 0.113 | 0.093 | 0.425 |
| Temperature, ° F | 64.4–212 | 59–212 | 32–212 |

Attempts to use carbon and graphite as friction discs have heretofore been unsuccessful. Carbon has excellent heat capacity (0.165 B.t.u./° F. in a range of 75.2 to 154.4° F.), thermal conductivity (10 to 100 B.t.u./ft.$^2$/° F./hr./ft. depending on density), and friction properties over the temperature range of use. Furthermore, it has no melting point (it sublimes at about 3600° C.) and therefore, can be used at temperatures much higher than those for which metals are used. (Compare these properties with those in above Table I.) Unfortunately, carbon has very poor tensile and shear strengths. Brake discs heretofore fabricated from carbon or graphite have shown a tendency to develop cracks which were either radial or approximately parallel to the circumference.

The present invention provides a disc brake having a plurality of friction discs one or more of which is made, in part, of carbon or graphite and which (a) will withstand temperatures in excess of 3000° F. without being destroyed, (b) have adequate tensile and shear strengths to withstand all normal strains to which they are subjected in use, and (c) possess properties such that they can even be reused after a rejected take-off.

Briefly, according to this invention, a friction disc is provided which is comprised of a central or inner annular frictional member having a centered circular aperture therein and a peripheral confining metallic member which encircles the inner frictional member and serves to maintain the inner frictional member under compression at least during its periods of active use while forces of torque are applied. The central or inner annular frictional member consists essentially of carbon or graphite, and preferably, particularly for the more severe conditions of use, a carbon or graphite body of the reinforced type hereinafter more fully described. The disc structure is so designed or manufactured as to place the carbon or graphite friction member under compression at least when used and forces of torque are applied.

THE DRAWINGS

DETAILED DESCRIPTION

Figure 1:
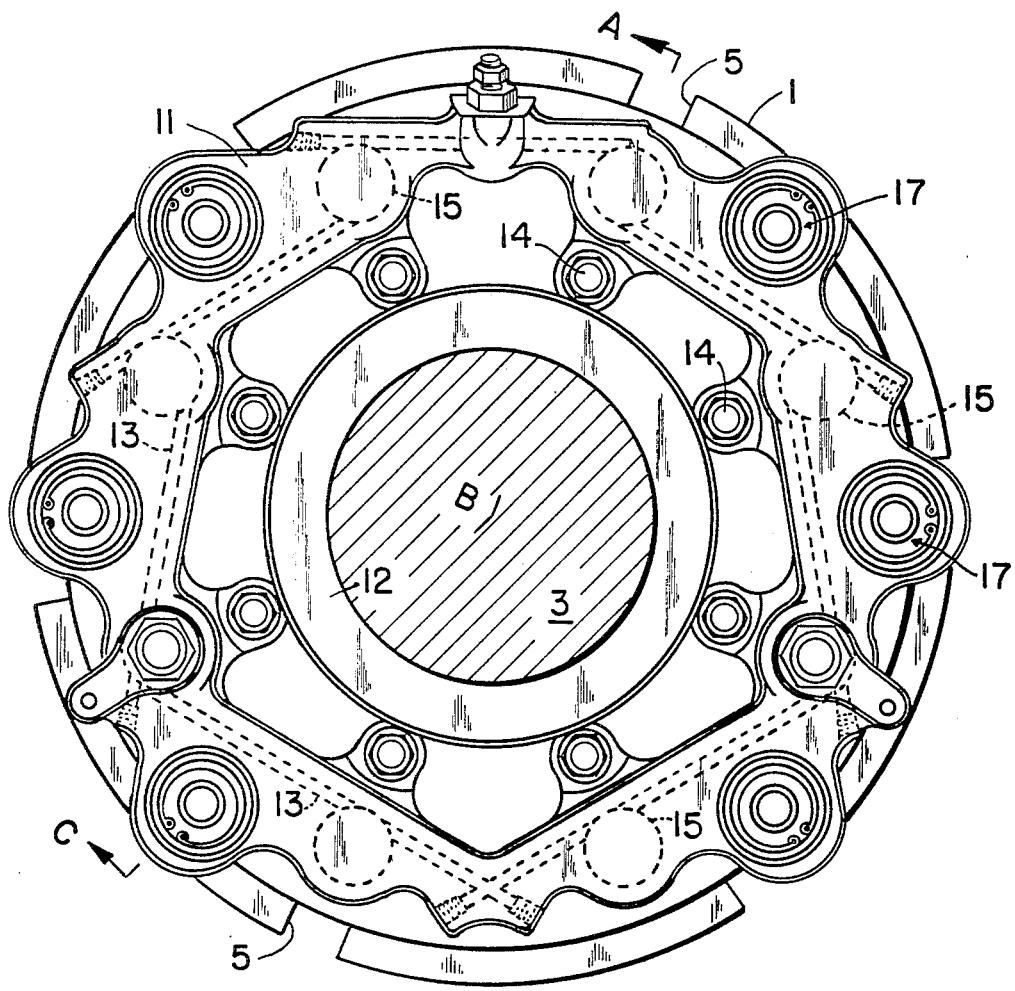
FIG. 1 is a front view of a multiple disc brake embodying various features of the present invention.
Figure 2:
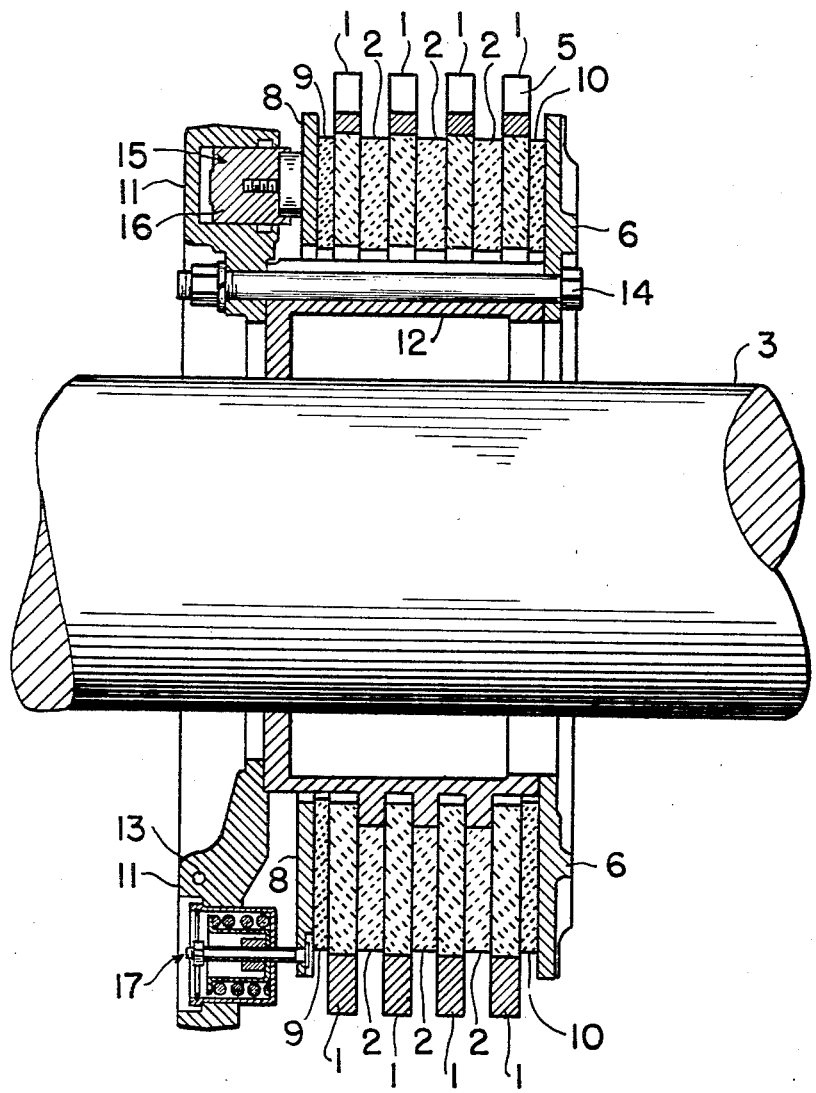
FIG. 2 is a rotated section view of a multiple disc brake taken along lines A–B and B–C of FIG. 1.

The following detailed description is made with reference to FIGS. 1 and 2, which illustrate a multiple disc-type aircraft brake. Disc brakes comprise driven discs 1 and stationary discs 2 which have cenertally located circular apertures and are radially spaced about a shaft 3. The shaft supports the rotating driven member which is to be arrested by the brake. (The driven member which in this case is the wheel hub is not shown in the drawings.) The driven discs have keyways 5 so that they can be fixed by keys to the driven member or hub. The driven discs are slideably fixed to the hub so they can move parallel to the shaft 3, that is, axially. The driven discs 1 and the stationary discs 2 are alternately arranged along the shaft 3. They are placed between a metal thrust plate 6 and a metal pressure plate 8 which also have central apertures and are placed about the shaft 3. The pressure plate and thrust plate may have friction pads 9 and 10 attached thereto. Adjacent the pressure plate is a metal torque plate 11 which is fixed relative to the hub. A metal torque tube 12 is concentric with the shaft 3 and passes through the apertures of the friction discs and pressure plates. The torque plate 11, torque tube 12 and thrust plate 6 are secured together by a fastening means 14. Keyways are provided on the inner peripheral edges of the stationary discs 2 which allowed them to be slideably attached by keys to the torque tube 12. The stationary discs also can move axially.

Hydraulic cylinders 15 are located in the torque plate spaced about the periphery of the torque plate. The cylinders may be in communication by means of passages 13 within the torque plate. The cylinders 15 contain pistons 16 which, during braking, urge the pressure plate 8 against the adjacent friction disc thus compressing the driven discs 1 and the stationary discs 2 together and against the thrust plate 6. The pressure applied to the friction surfaces is approximately 100 p.s.i. Generally, a spring means 17 attached to the torque plate and the pressure plate is provided to retract the pressure plate when braking is no longer desired.

Figure 5:
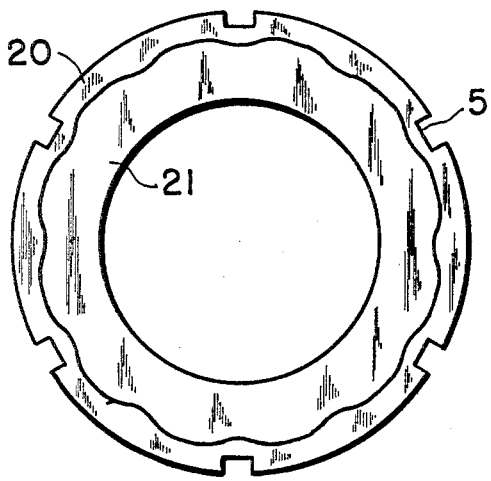
Figure 6:
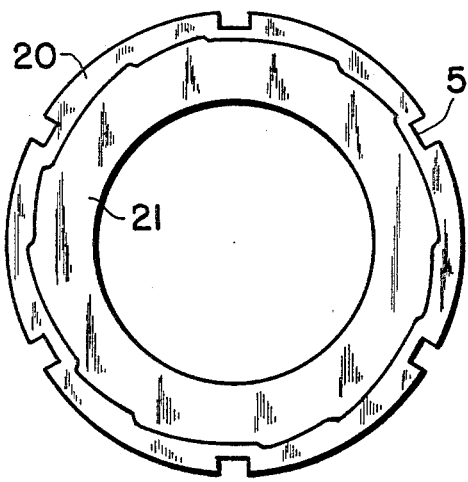
Figure 7:
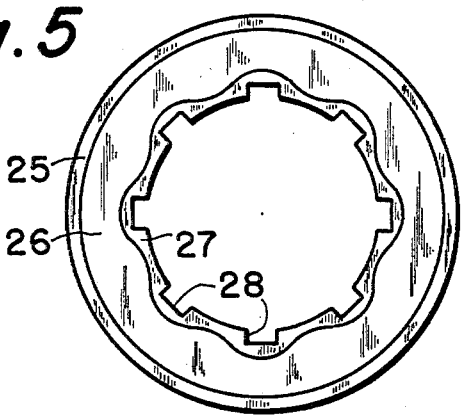

Friction discs, according to this invention, are illustrated in FIGS. 3–7. FIGS. 3–6 are illustrations of driven friction discs whereas FIG. 7 is an illustration of a stationary friction disc. Driven friction discs according to this invention consist of a central or inner annular friction member or part 21 and an outer perpheral confining member or part 20. The central or inner annular frictional member or part consists essentially of carbon or graphite and is either placed under a permanent state of compression by the outer confining member 20 during fabrication of the composite disc structure, which would be the case with the specific disc structure shown in FIG. 3, and also could be the case with the disc structures of FIGS. 4 to 7, inclusive, all as will be more fully explained later herein. However, the composite disc structure of the present invention can also be so designed that the outer metallic confining member 20 serves to exert the necessary compressive forces upon the inner frictional member 20 only when the latter is subjected to the active torque forces during braking performance (see FIGS. 4, 5, 6 and 7), although obviously these latter type brake discs can be similarly fabricated so as to place the inner frictional members under permanent compression, in addition to those forces of compression brought to bear on the inner frictional member by the outer confining member during periods of active use, if desired. The faces of the central or inner annular member part are friction surfaces. The outer peripheral confining member or part of the disc 20 is metal. In the peripheral metal part or ring of driven discs are keyways 5 for slideably fixing the composite disc to a wheel hub. Metals suitable for use in the peripheral ring 20 include steel, aluminum, titanium and nickel alloys. Other metals may be used so long as they have a satisfactory tensile strength at operating temperatures and conditions of use.

The inner annular frictional member or component of the present composite disc structures is referred to herein throughout the specification and claims as consisting essentially of carbon. The term "carbon" when so used is to be construed or interpreted in the broad or generic sense as meaning not only the various commercial grades of carbon on the market, but also the various commercial forms or grades of partially or fully graphitized carbon or graphite commonly available. Carbon has been frequently referred to as amorphous or essentially non-crystalline whereas graphite is often looked upon as the common crystalline form of carbon, diamond being the less common crystalline variety of carbon. However, it is generally recognized that there is no sharp or distinct dividing line, crystallographically speaking, between commercial grades of carbon and graphite, but there are various degrees of graphitization in carbon bodies, depending on the methods of fabrication, and particularly its thermal history. For purposes of this invention no distinction need be drawn between the two, and where reference is made to carbon, graphite is included, as pointed out above.

The particular form of carbon chosen should have tensile and shear strengths sufficient to withstand the forces applied through the metal ring during braking. It should be understood that the carbon part may include materials, such as non-carbon additives, which improve its physical properties such as wear resistance without removing it from the scope of this invention. Such additives may be in the form of ingredients of the raw batch from which the carbon body is initially formed, or they may be incorporated in the body by impregnation or infiltration. According to a preferred aspect of this invention, the central or inner frictional member or part consists of a reinforced carbon body formed from a plurality of carbon fibers or fabrics bonded by a carbon binder. Reinforced carbon bodies have tensile strengths in the ringe of 5000 to 9000 p.s.i. The carbon fibers or fabrics used in forming reinforced carbon bodies are derived from carbonization of carbonizable fibrous materials such as cellulosic fibers

TABLE II

| Physical Properties, Standard Layered Cloth "Carb-I-Tex"[1] Typical Values 68–212° F. | Grades | | |
|---|---|---|---|
| | 100 | 500 | 700 |
| Structure: | | | |
| Bond material | Carbon | Carbon | Graphite |
| Base material | Carbon | Graphite | Graphite |
| Purity (percent elemental carbon content) | 99.5 | 99.7 | 99.9 |
| Density (gm./cc.) | 1.38 | 1.40 | 1.44 |
| Flexural Strength (p.s.i.) with grain | 14,000 | 17,600 | 11,000 |
| Compressive Strength (p.s.i.): | | | |
| With grain | 8,000 | 10,200 | 7,600 |
| Against grain | 45,000 | 40,000 | 21,000 |
| Tensile Strength (calculated p.s.i.) with grain | 7,000 | 8,800 | 5,500 |
| Young's Modulus (p.s.i.×10$^5$) with grain | 16 | 27 | 13 |
| Coefficient of Thermal Expansion (in./in./° F.)×10$^{-7}$: | | | |
| With grain | 8.9 | 6.1 | 5.9 |
| Against grain | 8.3 | 14.1 | 18.0 |
| Coefficient of Thermal Conductivity (B.t.u./ft.$^2$/° F./hr./ft.): | | | |
| With grain | | 12 | |
| Against grain | | 3 | |
| Scleroscope Hardness: | | | |
| With grain | 90 | 76 | 30 |
| Against grain | 57 | 59 | 32 |

[1] "Carb-I-Tex" is the registered trademark for reinforced carbons manufactured and sold by The Carborundum Company at Sanborn, New York.

or fabrics. The fiber may be used, for example, as woven or nonwoven cloth sheets, strips, yarn or individual fibers. Reinforced carbons are bonded by impregnating them with resins and pitches which can be carbonized by curing and baking. It has been found that reinforced carbons formed from a plurality of laminated woven carbon cloths are especially suitable for use in this invention.

The physical properties of several commercially available reinforced carbons as reported in the literature are given in the table above.

Permanent compression in the inner annular friction member of discs according to this invention can be provided among other ways by shrink fitting the peripheral metal confining ring or member onto the inner carbon friction member. As in the case of all shrink fits, the amount of room temperature interference that can be provided depends among other facts on the outer diameter of the inner friction member. "Interference" can be defined as the amount of oversize of the diameter of the inner frictional member at room temperature in relation to the inner diameter of the outer confining member into which the friction member is to be placed.

The amount of interference provided should at least insure that the outer confining ring member fits against the carbon friction member with sufficient snugness or tightness at the maximum temperatures reached during braking that torque can be transferred from the ring to the carbon friction member. However, the maximum compressive stress in the inner carbon friction member should not exceed about 7000 p.s.i. (the approximate compressive strength of carbon materials).

Other means of fabricating the composite brake disc so that the outer metal ring places the inner frictional member under permanent compression can be used such as, for example, by use of a split and hinged ring which is press-fitted about the inner frictional member and secured by any suitable means as by bolting or welding to open ends of the split ring diametrically opposite the hinged side while under pressure.

Figure 3:
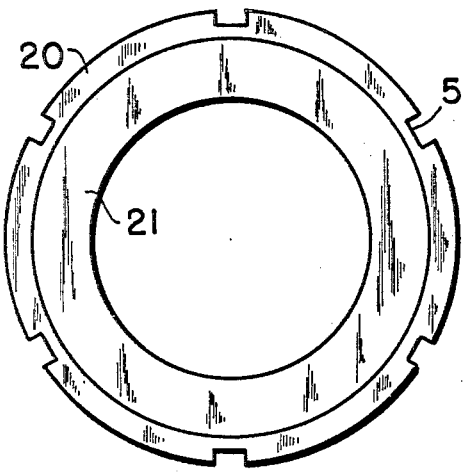
FIGS. 3, 4, 5, 6 and 7 are front views of the individual brake discs of a disc brake assembly, according to this invention.
Figure 4:
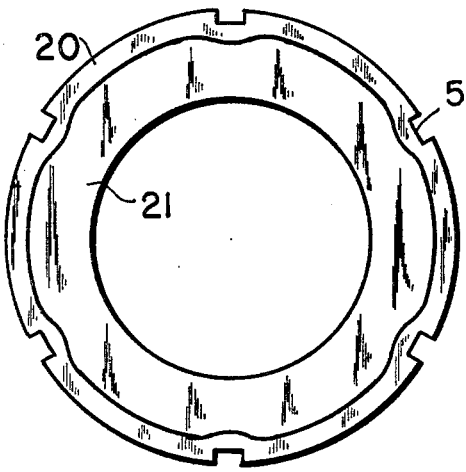

The junction or peripheral boundary between the carbon inner frictional member part and the outer peripheral confining ring member may simply be circular as shown in FIG. 3 in which case reliance for the compression of the inner frictional member is almost, if not entirely, upon the amount of interference between the two at room temperature, or other means of press-fitting the two components. Preferably, the junction or boundary line between the two parts is scalloped or irregular as in FIGS. 4, 5 and 6. When the junction or boundary line is scalloped or irregular, as shown in FIGS. 4, 5 and 6, in addition to the compression maintained on the carbon inner frictional member by the outer retaining or confining ring by reason of the room temperature interference between the two parts, additional compression is imposed on the inner frictional member by the outer confining ring whenever the disc is subjected to forces of torque. In fact, with such designs such compression forces imposed when torque is applied can be of themselves sufficient to impart adequate compression to the inner frictional member to serve the purposes of this invention without resort to a shrink fitting or other comparable fabricating technique, although a combination of the two sources of compression is to be desired for maximum results. The scallop should be shaped to minimize the stress concentration or rises around the nodes. The depth of the nodes should be minimized to maintain the overall depth of the peripheral ring as thin as practical.

A particularly satisfactory scallop pattern is a curtate hypocycloid or curtate epicycloid. These curves are the locus of a point on the interior of a circle that rolls along the inside or outside of a fixed circle. Such regularly repeating curves are advantageous in that they can be expressed in the form of the parametric equations below which can be used as the basis for computerized instructions to automatically machine generate such curvatures in the co-acting parts.

CURTATE EPICYCLOID

Parametric equations for generating curate epicycloid curves $$X = (r_1 + r_2) \cos \theta - d \cos \left(\frac{r_1 + r_2}{r_2} \theta\right)$$

$$Y = (r_1 + r_2) \sin \theta - d \sin \left(\frac{r_1 + r_2}{r_2} \theta\right)$$

$r_1$ = radius of base circle
$r_2$ = radius of generating circle
$d$ = distance from center of generating circle to generating point Minimum distance from center:

$$r_1 + r_2 - d$$

Maximum distance from center:

$$r_1 + r_2 + d$$

$$r_2 = r_1 / n$$

where $n$ = number of desired loops or cusps
so then $$\frac{r_1 + r_2}{r_2} = n + 1$$

The scallop pattern shown in FIG. 6 has a long leg and a short leg between nodes. This pattern is satisfactory for purposes of obtaining compression on the inner frictional member but has the disadvantage that the disc must be driven in the clockwise direction and lacks the machine fabricating advantages of the regular curtate epicycloid or curtate hypocycloid lines of FIGS. 4, 5 and 7.

FIG. 7 shows a preferred stationary disc according to this invention. There is a peripheral metal ring 25, an inner carbon friction member or part 26 and an innermost part 27. The peripheral ring 25 and innermost part 27 are metal. The junction between the inner part and intermediate carbon friction member is preferably scalloped for the same reasons given above in regard to the structures of FIGS. 4 and 5. Keyways 28 are provided in the innermost part to fix it, for example, to a torque ring. The three parts of this composite disc are shrink fitted together such that the carbon frictional member is substantially all in compression and the innermost part is also in compression. The ring 25 should be thinner than the carbon member 26, the faces of which are the friction surfaces. Otherwise, the metal ring would become part of the friction surface.

Composite discs according to this invention do not have the same tendency to fail by cracking due to tensile and shear stresses that were experienced by prior art discs consisting essentially of carbon. This is because in the composite brake structures constructed in accordance with the present invention, the carbon member is in compression, so that it takes a certain amount of stress to overcome the compressive component as well as the inherent material strength of the frictional member.

Discs according to this invention enable the construction of a multiple disc brake which can operate under conditions more severe than those that conventional brakes can endure without catastrophic failure. Since discs according to this invention can be used under more severe conditions, including higher temperatures, the total heat sink capacity is increased thereby enabling smaller brakes to do the same job that larger conventional brakes performed or operate satisfactorily under conditions more severe than those for which the same size discs of conventional structure are acceptable. Brake discs embodying the features of the present invention also have the advantage that they can be used without necessarily redesigning the existing associated mounting structure of existing brake assemblies.

Having thus described my invention in the manner required by the patent laws, what is requested to be protected by Letters Patent is set forth in the appended claims.

I claim:
1. In a disc-type brake for arresting the rotation of a driven member bearing on a shaft, said brake comprising at least one drive friction disc and at least one stationary friction disc radially spaced about said shaft, means for axially compressing the friction disc together, means fixed relative to said driven member for supporting said stationary discs and said axially compressing means, means for transferring torque from said stationary friction disc to said supporting means, means for transferring torque from said driven member to said driven disc, the improvement comprising at least one friction disc consisting of an inner annular frictional member having an aperture therein and an outer peripheral confining member, said peripheral member being metal and said inner frictional member consisting essentially of carbon in compression.

2. A multiple disc aircraft brake for arresting the rotation of a driven wheel hub bearing on a shaft, said brake comprising at least one driven friction disc, at least one stationary friction disc, a pressure plate, a thrust plate, and a torque plate fixed relative to said hub, said discs and plates having centrally located apertures and being axially spaced around said shaft such that the friction discs are between the thrust plate and pressure plate and the torque plate is adjacent to the pressure plate, a torque tube concentric with said shaft and passing through the aperture in said discs and pressure plate, means for securing the thrust plate and the torque plate to torque tube, means for slideably securing the stationary discs to the torque tube such that they move axially, means for slideably securing the driven plates to the hub such that they can move axially, means attached to said torque plate for axially compressing said friction discs between said pressure plate and said thrust plate, the improvement comprising at least one friction disc consisting of an inner annular frictional member and a metallic outer peripheral confining member, said frictional member consisting essentially of carbon in compression.

3. As an element of a disc-type brake, a composite friction disc consisting of an inner annular friction member and an outer peripheral confining ring, said peripheral member being metal and said frictional member consisting essentially of carbon in compression.

4. In a disc-type brake comprising at least one friction disc, the improvement comprising at least one friction disc consisting essentially of an inner annular frictional member having an aperture therein and an outer peripheral confining member, said peripheral member being metal in tension and said inner frictional member consisting essentially of carbon in compression.

5. Disc brakes according to claim 4 in which the junction between the inner frictional member and the peripheral confining member is scalloped.

6. Disc brakes according to claim 4 in which the junction between the inner frictional member and the peripheral member is scalloped such that stress rises around the scalloped nodes are minimized.

7. Disc brakes according to claim 4 in which the inner frictional member of the disc consists essentially of reinforced carbon which is a plurality of laminated woven carbon cloths bonded by carbon.

8. Disc brakes according to claim 4 in which the inner frictional member consists essentially of carbon reinforced by carbon fibers.

9. In a disc-type brake comprising at least one friction disc, the improvement comprising at least one friction disc consisting essentially on an inner annular friction member consisting essentially of carbon and an outer peripheral cofining metal member, the outer pehipheral contour of the friction member conforming closely to the contour of the inner periphery of the confining member the contour of which is such that the carbon frictional member is placed under compression by the confining member when forces of torque are applied to the disc.

10. Disc brakes according to claim 9 in which the junction between the frictional member and the peripheral confining member is scalloped.

11. Disc brakes according to claim 9 in which the contour line between the frictional member and the peripheral confining member is a curtate cycloid.

12. As an element of a disc-type brake, a composite friction disc consisting of radially spaced inner, central and peripheral parts, said peripheral member being metal in tension, said central part consisting essentially of carbon and being susbtantially all in compression and said inner part having a circular aperture therein and being metal.

13. Brake discs according to claim 12 in which the junction between the central and peripheral parts is scalloped.

14. Brake discs according to claim 12 in which the junction between the central and peripheral parts is scalloped so that stress rises around the scalloped nodes are minimized.

15. Disc brakes according to claim 12 in which the central part of the disc consists essentially of reinforced carbon which is a plurality of laminated woven carbon cloths bonded by carbon.

16. Brake discs according to claim 12 in which the central part consists of carbon reinforced by carbon fibers.

References Cited

UNITED STATES PATENTS 2,388,123   10/1945   Conrodty _____ 188—251

FOREIGN PATENTS 642,432   9/1950   Great Britain.

GEORGE E. A. HALVOSA, Primary Examiner

U.S. Cl. X.R.

192—107